US012598443B2

(12) United States Patent
Pelzer et al.

(10) Patent No.: US 12,598,443 B2
(45) Date of Patent: Apr. 7, 2026

(54) SYSTEM AND METHOD OF PROVIDING FADED AUDIO EXPERIENCE DURING TRANSITION BETWEEN ENVIRONMENTS

(71) Applicant: Apple Inc., Cupertino, CA (US)

(72) Inventors: Soenke Pelzer, Los Gatos, CA (US); David E. Romblom, Palo Alto, CA (US); Kacper Kosikowski, San Francisco, CA (US); Dirk Schroeder, San Jose, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 18/339,950

(22) Filed: Jun. 22, 2023

(65) Prior Publication Data

US 2024/0007820 A1 Jan. 4, 2024

Related U.S. Application Data

(60) Provisional application No. 63/357,528, filed on Jun. 30, 2022.

(51) Int. Cl.
*H04S 7/00* (2006.01)

(52) U.S. Cl.
CPC .................................... *H04S 7/305* (2013.01)

(58) Field of Classification Search
CPC .. H04S 7/00; H04S 7/305; H04R 3/00; H04R 2430/03; H04R 13/194; G06T 11/00; G02B 27/0179; G06F 3/011
USPC .......................................................... 381/300
See application file for complete search history.

(56) References Cited

U.S. PATENT DOCUMENTS

| | | | | |
|---|---|---|---|---|
| 11,880,911 | B2 * | 1/2024 | Nepveu | H04N 13/194 |
| 2016/0203811 | A1 * | 7/2016 | Brockmole | H04S 7/30<br>381/94.5 |

* cited by examiner

*Primary Examiner* — Yosef K Laekemariam
(74) *Attorney, Agent, or Firm* — Aikin & Gallant, LLP

(57) ABSTRACT

An audio system and a method of providing a faded audio experience during a transition from a first audio experience to a second audio experience, is described. The first audio experience can include playback of an audio signal spatialized using a first space impulse response that is generated by the audio system. The second audio experience includes playback of the audio signal spatialized using a second space impulse response that is received by the audio system. The audio system generates a hybrid space impulse response based on the first space impulse response and the second space impulse response. During the transition between audio experiences, the hybrid space impulse response is used to spatialize the audio signal to create the faded audio experience. Other aspects are also described and claimed.

20 Claims, 5 Drawing Sheets

SYSTEM AND METHOD OF PROVIDING FADED AUDIO EXPERIENCE DURING TRANSITION BETWEEN ENVIRONMENTS

This patent application claims the benefit of the earlier filing date of U.S. provisional application No. 63/357,528 filed Jun. 30, 2022.

FIELD

Aspects related to systems having audio capabilities are disclosed. More particularly, aspects related to audio systems used to render spatial audio are disclosed.

BACKGROUND

Mixed Reality (MR) and Virtual Reality (VR) are technologies that provide, to a lesser or greater degree, simulated experiences. The simulated environments can include virtual visual renderings and corresponding audio renderings. For example, MR and VR systems can render spatialized audio that is coherent with the visualization of the environment.

Acoustic energy that travels in a listening environment, such as a room, can bounce off surfaces of the listening environment. The reflected acoustic energy can reflect from one surface to another. The acoustic energy dissipates over time as it travels through, and is absorbed by, the environment. This phenomenon is known as reverberation. Reverberation occurs naturally in the real world. Reverberation can also be electronically added to audio to add a sense of space to the auditioned sound. When a user experiences an MR or VR environment while in a room, reverberation that corresponds to the room may be different than reverberation that corresponds to the MR environment, which may be different than reverberation that corresponds to the VR environment. Audio systems can auralize virtual environments by simulating sound propagation within the environments that are being visually rendered to the user.

SUMMARY

Existing methods of auralizing virtual environments lack a means of smoothly transitioning the audio experience when the user transitions from one simulated environment to another. For example, a user may be immersed within a mixed reality (MR) environment and may subsequently transition to a virtual reality (VR) environment. As used herein, "MR" merges both real and virtual stimuli in an MR environment that can be experienced by a user. In contrast, "VR" uses entirely virtual stimuli in a VR environment that can be experienced by the user. In either case, from a visual perspective, this transition can occur abruptly or gradually without disrupting the user experience. From an audio perspective, however, if the differing reverberations of the environments is not accounted for, crossfading the audio of the environment during the transition can create artifacts in the audio, e.g., comb filtering, which can disrupt and degrade the user experience.

An audio system and a method of using the audio system to provide a faded audio experience during a transition from a first audio experience to a second audio experience, are described. A user may be presented with a visual rendering of an MR environment, and a transition to a visual rendering of a VR environment may begin. For example, the virtual experience can transition from a view of a MR space, e.g., a meeting room detected by a visual system and microphone system, to a view of a VR space, e.g., an artistically rendered forest. As the transition occurs, the audio system can provide a smooth acoustic spatial crossfading. More particularly, the audio system can perform the audio transition that blends impulse responses of the spaces in a manner that renders artifact free audio, which naturally and realistically reproduces the experience of moving from one space to another.

In an aspect, the method performed by the audio system includes generating a first space impulse response of a first environment, e.g., the MR environment. The first space impulse response can be used to spatialize an audio signal for playback. When the spatialized audio is played back, a listener can enjoy a first audio experience consistent with the first environment. The audio system receives, or generates, a second space impulse response of a second environment, e.g., a VR environment. The second space impulse response can be used to spatialize the audio signal for playback. When the spatialized audio is played back, a listener can enjoy a second audio experience consistent with the second environment. The space impulse responses can be encoded in metadata associated with the audio signal.

The audio system can perform a transition from the first audio experience to the second audio experience. The transition may occur in response to a user action. For example, a listener can adjust a physical interface (e.g., rotate a physical dial or press one or more buttons), a virtual interface (e.g., a virtual slider or dial), or any other suitable adjustable user-controllable setting(s) of the audio system, and the audio system can responsively transition from the first audio experience to the second audio experience.

The audio system generates, in response to the transition, a hybrid space impulse response. The hybrid space impulse response is based on the first space impulse response and the second space impulse response. The hybrid space impulse response can include a faded value for an event parameter, e.g., a direction of arrival of an acoustic event, which is intermediate to values of the event parameter for the acoustic event in the first environment and the second environment. The hybrid space impulse response can therefore be intermediate between the first space impulse response and the second space impulse response. Derivation of the hybrid space impulse response can be performed in a metadata layer of the audio. More particularly, the metadata associated with the first environment can be combined, e.g., averaged with, the metadata associated with the second environment. Accordingly, the hybrid space impulse response can be encoded in metadata of the faded environment that is intermediate to the metadata of the first environment and the second environment.

The audio system spatializes the audio signal using the hybrid space impulse response to generate a faded audio experience. The faded audio experience can be rendered to the listener while the audio system transitions from the first environment to the second environment. For example, during the transition, the listener may experience the transition as though moving from a small space, e.g., a meeting room, to a larger space, e.g., a forest. The faded audio experience can be free of audio artifacts, such as comb filtering. More particularly, the transition can be experienced as a smooth and realistic audio transition from the first audio experience to the second audio experience.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have advantages not specifically recited in the above summary.

DETAILED DESCRIPTION

Figure 1:
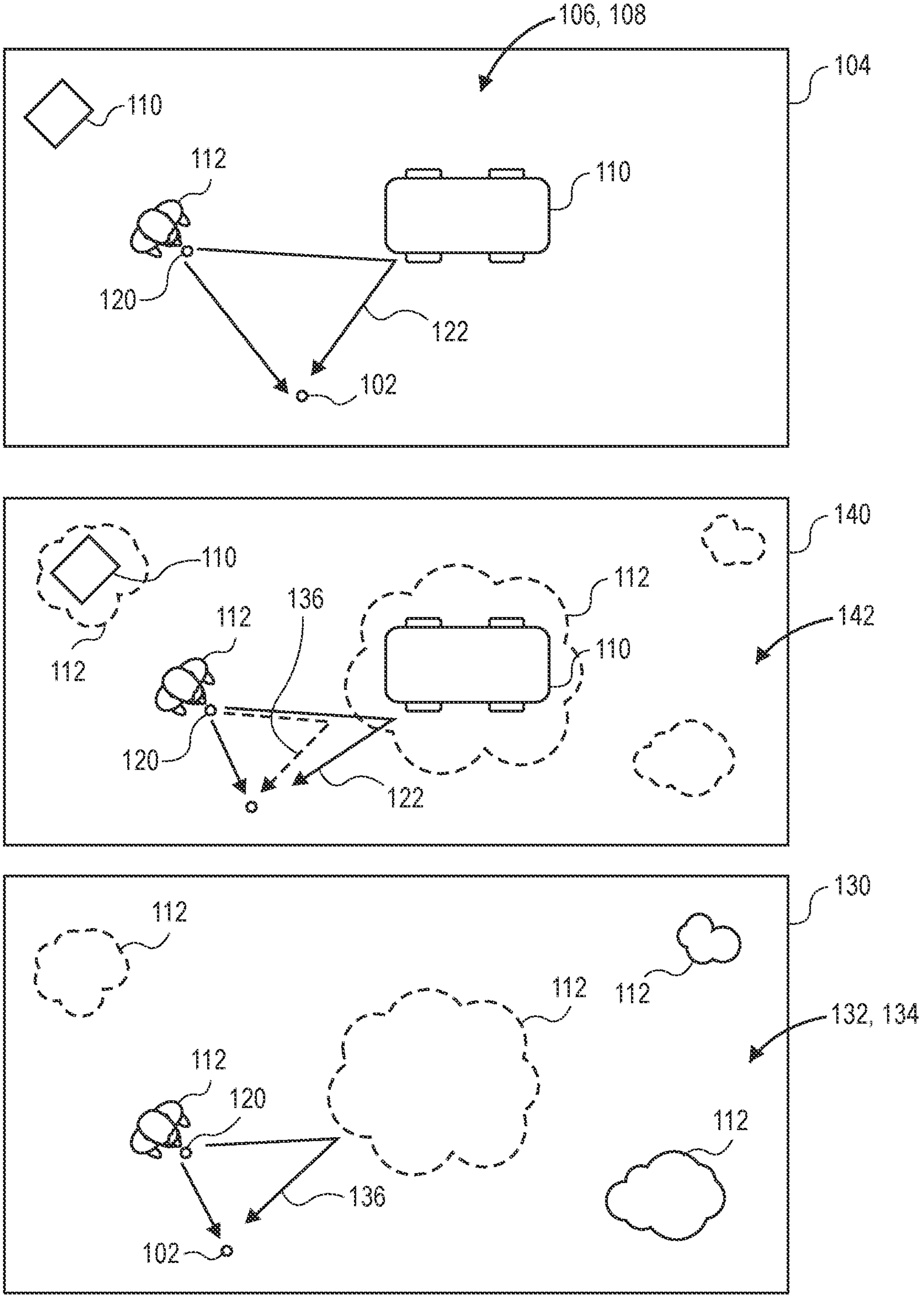
FIG. 1 is a pictorial view of a transition between audio experiences, in accordance with an aspect.

Aspects describe an audio system and a method of providing a faded audio experience during a transition from a first audio experience to a second audio experience. The audio system can include an audio device, such as a head-mounted device. The audio system may include another wearable device, however, such as headphones or a telephony headset, to name only a few possible applications.

In various aspects, description is made with reference to the figures. However, certain aspects may be practiced without one or more of these specific details, or in combination with other known methods and configurations. In the following description, numerous specific details are set forth, such as specific configurations, dimensions, and processes, to provide a thorough understanding of the aspects. In other instances, well-known processes and manufacturing techniques have not been described in detail to not obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the features, structures, configurations, or characteristics may be combined in any suitable manner in one or more aspects.

The use of relative terms throughout the description may denote a relative position or direction. For example, "forward" may indicate a first direction away from a reference point. Similarly, "backward" may indicate a location in a second direction away from the reference point and opposite to the first direction. Such terms are provided to establish relative frames of reference, however, and are not intended to limit the use or orientation of an audio system or system component, e.g., an audio device, to a specific configuration described in the various aspects below.

By way of introduction, environment and electronic systems that enable a person to sense and interact with such environments are described. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner like how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many distinct types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In an aspect, an audio system provides an audio experience to a user that corresponds to a visual experience being presented to the user. The user may use the audio system to experience a first environment, e.g., a mixed reality (MR) environment. Subsequently, the user may use the audio system to experience a second environment, e.g., a virtual reality (VR) environment. The MR and VR environments can have respective space impulse responses corresponding to reverberation within the environments. The audio system can generate a hybrid space impulse response that is based on the space impulse responses of the MR and VR environments. The hybrid space impulse response can be used to spatialize an audio signal during the transition between the MR and VR environments to create a smooth acoustic spatial crossfading that is artifact free, e.g., has no comb filtering effect. Accordingly, the audio experience of the user can be a graceful and smooth transition between environments.

Referring to FIG. 1, a pictorial view of a transition between audio experiences is shown in accordance with an aspect. A listener 102 can perceive a first audio experience 104 while using an audio system. The audio system can model a first environment 106 within which the first audio experience 104 takes place. For example, the first environment 106 can be an MR environment 108. The MR environment 108 can include one or more real world objects 110 and one or more virtual objects visually rendered to the listener 102 through a display of the audio system. The real world objects 110 may include, for example, furniture within an actual room that the listener 102 is present within. For example, the listener 102 may be within a meeting room containing a desk and chairs. The virtual object may include, for example, a person 112 that is visually rendered to the listener 102. For example, the person may be a colleague located in a physically remote location relative to the room. The audio system can, however, visually render an image of the colleague to the listener 102 such that the listener perceives the colleague as being present within the meeting room.

An acoustic event 120 can be simulated within the first environment 106. For example, the visually rendered colleague may speak, and the speech of the colleague may be captured by microphones at the physically remote location and relayed to the audio system for playback to the listener 102. More particularly, the captured speech can be encoded in an audio signal that is received and played back by the audio system to render the acoustic event 120 to the listener 102.

To create a convincing rendition of the acoustic event 120, the audio signal can be convolved with a first space impulse response 122 of the first environment 106. A space impulse response characterizes the acoustics of an environment. The space impulse response can characterize an amount of acoustic energy in a space at separate times in response to a given sound, on a per sub-band level. Thus, the space impulse response may characterize the reverberation qualities of a given space. The space impulse response of a space varies depending on a geometry of the space, size of the space, objects in the space, and/or surface materials in the space.

As described below, the first space impulse response 122 can be generated or received by the audio system. The first space impulse response 122 can characterize the acoustics of the first environment 106, e.g., the meeting room, and how the first environment 106 responds to a given sound. Accordingly, the audio signal can be spatialized using the first impulse response to generate the first audio experience 104. More particularly, the first audio experience 104 can include playback of the audio signal spatialized using the first space impulse response 122. When the audio signal is convolved with the first space impulse response 122 of the first environment 106, the listener 102 can perceive the speech of the colleague as having direct components and reflections, e.g., a reflection that bounces off a desk before arriving at an ear of the listener 102.

A listener 102 can perceive a second audio experience 130 while using the audio system. The audio system can model a second environment 132 within which the second audio experience 130 takes place. For example, the second environment 132 can be a VR environment 134. The VR environment 134 can include one or more virtual objects visually rendered to the listener 102 through the display of the audio system. The virtual objects may include, for example, the colleague that is visually rendered to the listener 102 within the second environment 132. The virtual objects may include one or more other objects in the second environment 132. For example, the VR environment 134 may be a forest within which the colleague and the listener 102 are meeting. Accordingly, the one or more virtual objects can be trees in the forest. The virtual objects may or may not correspond to locations of the object(s) of the first environment 106. For example, one or more trees may be located throughout the second environment 132, e.g., overlaid on a desk or other furniture or objects within the meeting room. Accordingly, the second environment 132 can have different objects, albeit virtual ones, than the first environment 106. The second environment 132 may therefore have a different space impulse response than the first environment 106.

As described below, a second space impulse response 136 can be generated or received by the audio system. The second space impulse response 136 can characterize the acoustics of the second environment 132, e.g., the forest, and how the first environment 106 responds to a given sound. Accordingly, the audio signal can be spatialized using the second impulse response to generate the second audio experience 130. More particularly, the second audio experience 130 can include playback of the audio signal spatialized using the second space impulse response 136. When the audio signal is convolved with the second space impulse response 136 of the second environment 132, the listener 102 can perceive the speech of the colleague as having direct components and reflections, e.g., a reflection that bounces off a tree before arriving at an ear of the listener 102.

The listener 102 may transition between the first audio experience 104 and the second audio experience 130. For example, as described below, the audio system can receive a user input to cause the audio system to transition the visual and audio renderings from the first experience within the first environment 106 to the second experience within the second environment 132. It has been found, however, that transitioning between the experiences by crossfading the rendered audio from each environment creates artifacts in the audio experience. Crossfading the spatialized audio of the first audio experience 104 with the spatialized audio of the second audio experience 130 can cause sound corresponding to the same acoustic event 120 to be played back to the listener 102 at separate times. The delay in playback results from differences between the impulse responses of the environments. For example, the sound that reflects from the tree may arrive at a different time, from a different direction, and/or with a different level than the sound that reflects from the furniture. The delays in the sounds can result in a comb filter effect that is unnatural and disruptive to the listener's experience. The audio system can employ the techniques described below to avoid such disruptive audio artifacts and provide a graceful way to take the listener 102 from one acoustic space, e.g., the meeting room, to another acoustic space, e.g., the forest.

The audio system can render a gradual transition between the first audio experience 104 and the second audio experience 130 in a faded audio experience 140. The faded audio experience 140 can be generated by spatializing the audio signal using a hybrid space impulse response that corresponds to a faded environment 142. The hybrid space impulse response is described further below, and at this point it will be appreciated that the hybrid space impulse response may be based on, e.g., a hybrid of, the first space impulse response 122 and the second space impulse response 136. By way of example, the first space impulse response 122 and the second space impulse response 136 may be crossfaded to generate the hybrid space impulse response. Crossfading the impulse responses of the initial and final environments can produce an intermediate impulse response that, when convolved with the audio signal, creates reverberation that is intermediate to the reverberation in the constituent environments. More particularly, the faded environment 142 can be a perceptual hybrid of the first environment 106 and the second environment 132, and reflections of acoustic events 120 within the faded environment 142 will be intermediate to reflections within the other environments. The faded audio experience 140 may therefore be experienced by the listener 102 as a natural transition between the audio experiences. More particularly, the listener 102 can experience a gradual fade of the reverberation as the scene transitions from the meeting room to the forest. Given that a single space impulse response (the hybrid space impulse response) is applied to generate the played audio, the audio can avoid the same acoustic event being perceived with slight delays. More particularly, the faded audio experience 140 can be free of comb filtering. Thus, the faded audio experience 140 can seem natural to the listener 102.

Figure 2:
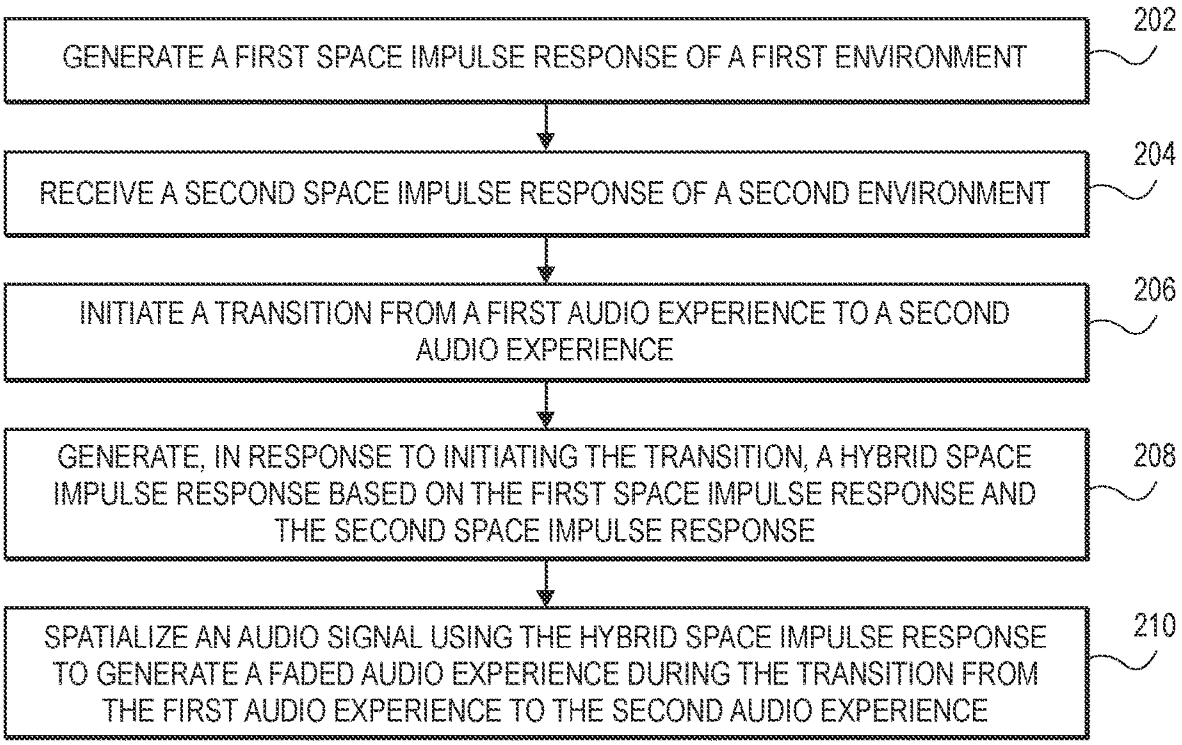
FIG. 2 is a flowchart of a method of providing a faded audio experience during a transition from a first audio experience to a second audio experience, in accordance with an aspect.

Referring to FIG. 2, a flowchart of a method of providing a faded audio experience during a transition from a first audio experience to a second audio experience is shown in accordance with an aspect. The method includes operations that are illustrated and described in detail with respect to FIGS. 3-5C. Accordingly, FIGS. 2-5C are described in combination below.

Figure 3:
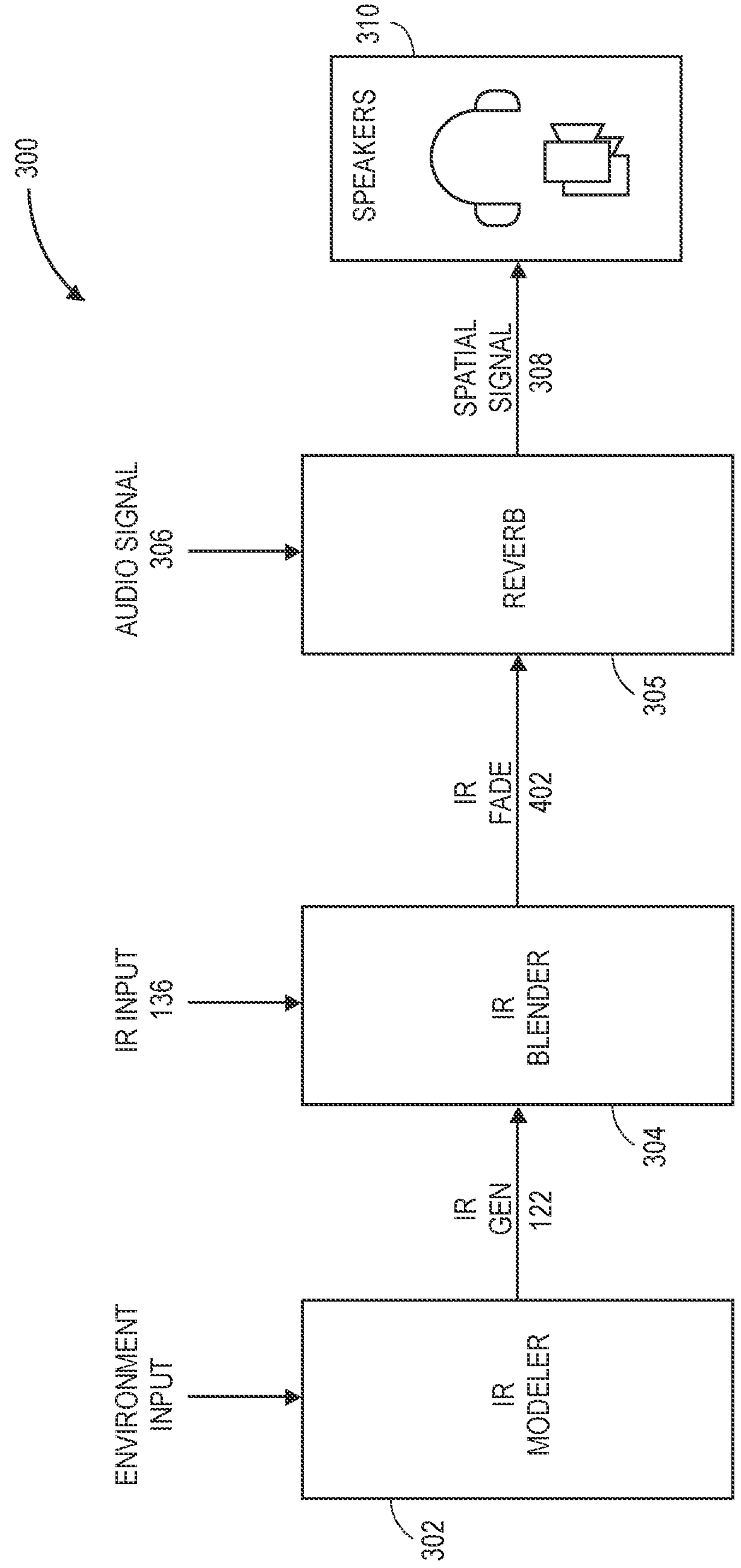
FIG. 3 is a block diagram of audio processing performed by an audio system, in accordance with an aspect.

Referring to FIG. 3, a block diagram of audio processing performed by an audio system is shown in accordance with an aspect. At operation 202, the audio system 300 can generate a first space impulse response 122 of the first environment 106. The first space impulse response 122 can be generated by an impulse response modeler 302 of the audio system 300. In an aspect, the first space impulse response 122 is generated in real-time.

The impulse response modeler 302 can generate the first space impulse response 122 based on inputs characterizing the environment. For example, the impulse response modeler 302 can receive data describing a geometry of the first environment 106, positions of sound source(s) within the first environment 106 (such as the colleague in the example above), and/or a location of the listener 102 within the environment. The impulse response modeler 302 may perform ray tracing using such information. Ray tracing is a method for calculating the path of waves (e.g., acoustic energy) or particles through a system with regions of varying propagation velocity, absorption characteristics, and reflecting surfaces. Wave fronts may bend, change direction, or reflect off surfaces, complicating analysis of the wave fronts. Ray tracing solves the problem by repeatedly advancing idealized narrow beams called rays through the medium by discrete amounts. Ray tracing can be performed by using the audio system 300 to simulate the propagation of many rays in a simulation environment, e.g., a three-dimensional model of a room or other space. Using ray tracing techniques, the audio system 300 can generate one or more impulse responses, which are associated with respective sound source(s). For example, the first space impulse response 122 can be associated with the sound source that creates the acoustic event 120. The first space impulse response 122 characterizes a delay and energy loss of the acoustic energy along a path, such as the reflective path from the colleague to the desk to the listener 102. The delay and energy loss can be frequency dependent.

An impulse response blender 304 of the audio system 300 can receive the first space impulse response 122, e.g., from the impulse response modeler 302. At operation 204, the audio system 300 can receive the second space impulse response 136 of the second environment 132. An impulse response blender 304 of the audio system 300 can receive the impulse response input, e.g., from a memory of the audio system 300. The second space impulse response 136 may be received prior to transitioning from the first audio experience 104 to the second audio experience 130. The second environment 132 may be a virtual environment that is artistically rendered offline. For example, the forest scene can be prepared offline in a reference simulation and stored in advance as a potential virtual meeting space. Ray tracing may be performed on the virtual environment to generate the corresponding space impulse response. Thus, the second space impulse response 136 may characterize a delay in energy loss of acoustic energy along a path, such as the reflective path from the colleague to the tree to the listener 102.

The space impulse responses, whether generated or received by the audio system 300, may be encoded in metadata. For example, ray trace simulations performed by the audio system 300 can generate a ray trace result that includes a space impulse response characterizing the environment(s). The metadata can be stored in data structures, such as plane wave lists. A plane wave list is a list of acoustic events. Each acoustic event in the list can have one or more associated parameters, such as a time of arrival, a direction of arrival, or a level. In a general case, there is a plane wave list per frequency sub-band. More particularly, the metadata can include a list of acoustic events within a predetermined frequency band. Furthermore, the acoustic events listed in the plane wave list may be listed in order of ascending time.

In the example described above with respect to FIG. 1, the acoustic event(s) resulting from the speech of the colleague, such as the reflected sound, can be associated with event parameters in each of the environments that the acoustic event 120 is simulated within. For example, the acoustic event 120 can be associated with first event parameters, e.g., a first direction of arrival, in the first environment 106, and second event parameters, e.g., a second direction of arrival, in the second environment 132. The parameters for the same acoustic event 120 may vary between the environments due to differences in the spaces. For example, the direction of arrival for the reflection from the desk can differ from the direction of arrival for the reflection from the tree. It should be appreciated that the metadata, which parameterizes the acoustic events 120, can be used to generate the space impulse response that gets applied to the sound source during audio rendering. Accordingly, the metadata is a parametric domain that encodes the space impulse responses, and modifications to the metadata can change the space impulse response of an environment. Similarly, a plane wave list may be created to generate a space impulse response.

At operation 206, the transition from the first audio experience 104 to the second audio experience 130 can be initiated. Initiation of the transition may be performed in several manners. For example, the audio system 300 may include a user-controllable setting, which may be adjusted to initiate the transition. In an aspect, the audio system 300 can include a dial, a switch, or another input device or element. The input device can be a physical component of the audio system 300, e.g., a physical dial on a housing of audio system 300, or a virtual component, e.g., a user interface dial that is displayed to the user for manipulation through virtual interactions. To initiate the transition, the listener 102 may adjust the input device. For example, the listener 102 can rotate the dial from an MR setting that causes rendition of the first audio experience 104 to a VR setting that causes rendition of the second audio experience 130.

At operation 208, the audio system 300 generates, in response to the initiation of the transition, a hybrid space impulse response. Generation of the hybrid space impulse response can be performed by the impulse response blender 304 of the audio system 300. The impulse response blender 304 can receive the first space impulse response 122, e.g., generated by the impulse response modeler 302 or otherwise received. Similarly, the impulse response blender 304 can receive the second space impulse response 136 from memory of the system as an impulse response input. The impulse response blender 304 may generate the hybrid space impulse response (denoted as "IR Fade") based on the first space impulse response 122 and the second space impulse response 136. For example, the impulse response blender 304 may crossfade the impulse responses to generate the hybrid space impulse response. The hybrid space impulse response can be output by the impulse response blender 304.

Crossfading of the first and second space impulse responses 122, 136 can be performed in the parametric domain. More particularly, the plane wave lists that are contained within the metadata of the first and second environments 106, 132 can be merged to generate a hybrid plane wave list for the faded environment 142. As described further below, different paradigms may be used to merge the metadata. In any case, the merged metadata encodes an impulse response that is intermediate to the first and second space impulse responses 122, 136. Accordingly, whereas the acoustic event 120 may have differing associated event parameters in the first and second environments 132, so may the acoustic event 120 have a respective event parameter in the faded audio experience 140. Furthermore, the event parameter may be intermediate to the event parameters from the merged metadata. Thus, reverberation of the faded audio experience 140 may be a mix of the reverberations of the first audio experience 104 and the second audio experience 130.

The impulse response blender 304 can quickly crossfade impulse responses in the metadata layer of the audio. The audio can be object-based, in which each sound source of the audio has a dedicated audio signal and corresponding metadata. As described above, the space impulse response of each environment is encoded in the metadata associated with the audio signal. Accordingly, the audio system 300 can combine, e.g., average, interpolate, or otherwise blend, the metadata to generate the hybrid space impulse response.

The audio system 300 can identify an acoustic event 120 in the plane wave list associated with the first environment 106 and the plane wave list associated with the second environment 132. The acoustic event 120 can be a perceptually prominent event in both environments. For example, the acoustic event 120 can be the reflection of sound from the table in the first environment 106 and the tree in the second environment 132. After identifying the acoustic event 120, the impulse response blender 304 can morph the metadata in the plane wave lists to arrive at the hybrid metadata.

The hybrid metadata can be intermediate to the metadata associated with the first environment 106 and the second environment 132. In an aspect, the impulse response blender 304 determines a first value of an event parameter associated with the acoustic event 120 in the first environment 106. For example, the direction of arrival of the reflected sound can be determined. The impulse response blender 304 can also determine a second value of the event parameter, e.g., the direction of arrival, of the event parameter associated with the acoustic event 120 in the second environment 132. Referring again to the example of FIG. 1, the angle of arrival at the listener 102 of the reflected sound is different in the first environment 106 than it is in the second environment 132. The audio system 300 can generate a faded value of the event parameter, which can be associated with the acoustic event 120 in the faded environment 142. The faded value may be a value between the first value and the second value. For example, if the reflection arrives from an angle of 45 degrees in the first environment 106 and 65 degrees in the second environment 132, the faded value may be assigned a value of 55 degrees by the audio system 300. The hybrid metadata can cause the audio to be rendered such that the reflected sound in the faded audio experience 140 seems to come from a direction that is between where the reflected sound would seem to come in the MR and VR environments 134. The faded value can be stored in metadata associated with the faded environment 142, as part of the encoded space impulse response for that environment.

The above general example can be further refined according to any of several crossfading paradigms. For example, crossfading of the space impulse responses can be performed according to an all-of-space paradigm (FIGS. 4A-4C) or a portal paradigm (FIGS. 5A-5C).

Figure 4A:
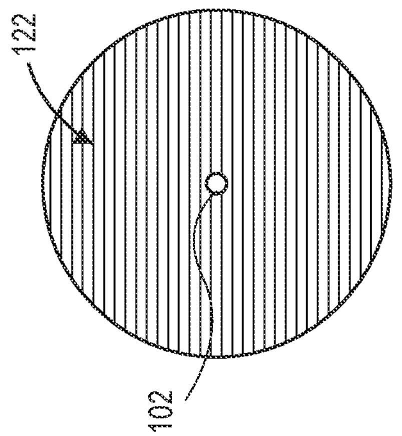
FIGS. 4A-4C are diagrammatic views of space impulse responses of environments corresponding to audio experiences being transitioned in an all-of-space paradigm, in accordance with an aspect.
Figure 5A:
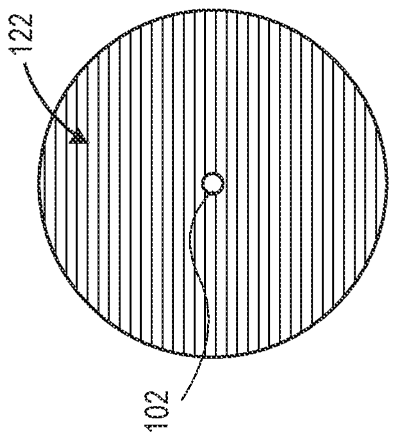
FIGS. 5A-5C are diagrammatic views of space impulse responses of environments corresponding to audio experiences being transitioned in a portal paradigm, in accordance with an aspect.
Figure 5B:
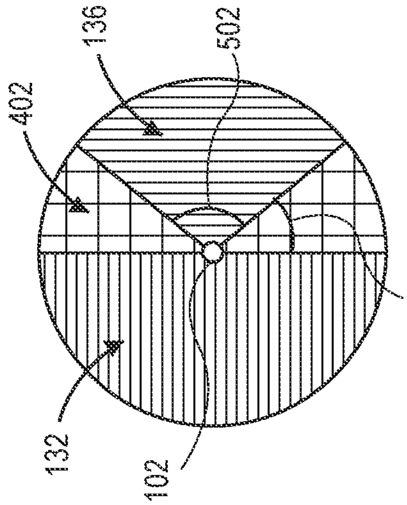
Figure 5C:
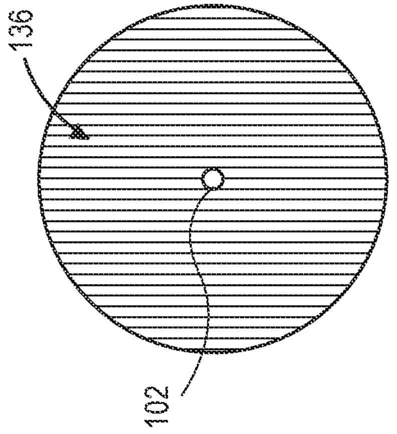

Referring to FIG. 4A, a diagrammatic view of a first space impulse response of a first environment corresponding to a first audio experience is shown in accordance with an aspect. In an all-of space paradigm, crossfading of the space impulse responses can occur without regard to a direction of arrival of acoustic events 120 at the listener 102. More particularly, during transition from the first audio experience 104 to the second audio experience 130, merging of metadata between plane wave lists of the first environment 106 and plane wave lists of the second environment 132 can occur in all directions, e.g., 360 degrees azimuth around the listener 102 and a hemisphere above the listener 102.

A forward direction relative to the listener 102 is depicted by an arrow. The diagram represents the first space impulse response 122, which is present during the first audio experience 104. More particularly, in the first audio experience 104, the first space impulse response 122 is applied to acoustic events 120 arriving from all directions relative to the listener 102. This is shown as the diagrammed circle having dense horizontal lines in all directions relative to the listener 102.

Figure 4B:
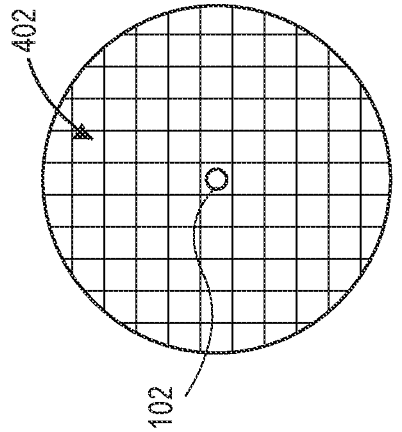

Referring to FIG. 4B, a diagrammatic view of a hybrid space impulse response corresponding to a faded audio experience 140 is shown in accordance with an aspect. During the transition from the first audio experience 104 to the second audio experience 130, a hybrid space impulse response 402 can be used to generate spatial audio around the listener 102. The hybrid space impulse can crossfade the impulse responses of the first environment 106 and the second environment 132 equally in all directions, regardless of a direction of arrival of acoustic events. The metadata from each plane wave list can be combined in a same manner regardless of the direction of arrival associated with the listed acoustic events. For example, an acoustic event 120 may have a first event parameter associated with the first environment 106 and a second event parameter associated with the second environment 132. When the transition is 50% complete, the faded value of the event parameter may be an average of the first event parameter and the second event parameter values. This is illustrated by horizontal lines having half the density of the lines in FIG. 4A and vertical lines having half the density of lines in FIG. 4C. By contrast, when the transition is 25% complete, the faded value may be more heavily weighed to the first plane wave list, e.g., the horizontal line density representing the first space impulse response may exceed the vertical line density representing the second space impulse response. Similarly, when the transition is 75% complete, the faded value may be more heavily weighed to the second plane wave list, e.g., the vertical line density representing the second space impulse response may exceed the horizontal line density representing the first space impulse response. The transition of the hybrid space impulse response 402 from the first impulse response to the second impulse response can cause the audio rendering to smoothly transition the audio experience of the listener 102. At each time during the transition, the hybrid space impulse response 402 can affect acoustic events 120 equally in all directions. Thus, the listener 102 can experience the transition as a blend between environments in all directions.

Figure 4C:
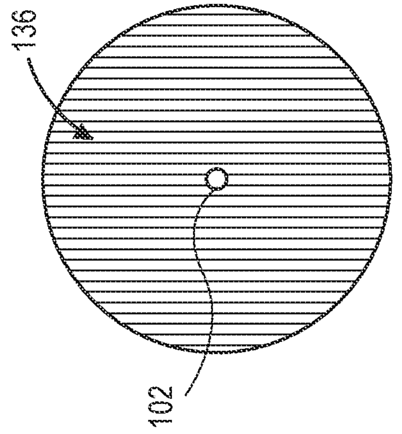

Referring to FIG. 4C, a diagrammatic view of second space impulse response of a second environment corresponding to a second audio experience 130 is shown in accordance with an aspect. The diagram represents the second space impulse response 136, which is present during the second audio experience 130 after the transition is complete. More particularly, in the second audio experience 130, the second space impulse response 136 is applied to acoustic events 120 arriving from all directions relative to the listener 102. This is shown as the diagrammed circle having dense vertical lines in all directions relative to the listener 102.

Referring to FIG. 5A, a diagrammatic view of a first space impulse response of a first environment corresponding to a first audio experience is shown in accordance with an aspect. In a portal paradigm, the listener 102 can experience the transition between environments as though a portal is opening between the two environments. Acoustic events from one direction, e.g., a forward direction relative to the listener 102, can be associated with a space impulse response of the environment that the listener 102 is entering, e.g., the second environment 132, and acoustic events from another direction, e.g., a backward direction relative to the listener 102, can be associated with a space impulse response of the environment that the listener 102 is leaving, e.g., the first environment 106. Accordingly, the listener 102 can experience the transition as though the listener 102 is moving from the first environment 106 into the second environment 132, e.g., stepping from a small space into a larger space. Such a transition can be aesthetically pleasing and provide helpful orientation queues to the listener 102.

The diagram represents the first space impulse response 122, which is present during the first audio experience 104. More particularly, in the first audio experience 104, the first space impulse response 122 is applied to acoustic events 120 arriving from all directions relative to the listener 102. This is shown as the diagrammed circle having dense horizontal lines in all directions relative to the listener 102.

Referring to FIG. 5B, a diagrammatic view of a hybrid space impulse response corresponding to a faded audio experience is shown in accordance with an aspect. In the portal paradigm, the diagrammed space impulse response of the faded environment 142 can include faded values of the event parameters that are based on the direction of arrival of an acoustic event 120. For example, at a time during the transition, acoustic events arriving at the listener 102 from behind the listener may be associated with the first space impulse response 122. By contrast, acoustic events arriving at the listener 102 from a forward direction may be associated with different space impulse responses as the portal into the second environment 132 opens. In an aspect, acoustic events having a direction of arrival within a forward azimuth 502, e.g., 60 degree about a forward-looking axis, may be associated with the second space impulse response 136 of the second environment 132. A transition zone may exist such that acoustic events 120 arriving from a direction between the forward azimuth 502 and the rearward direction can be associated with the hybrid space impulse response 402. For example, lateral zones to a left and a right side of the listener 102 may have respective lateral azimuths 504. Acoustic events having a direction of arrival within the lateral azimuth 504 can be associated with the hybrid space impulse response 402.

Determination of the hybrid space impulse responses 402 used in the portal paradigm can be like the determinations used in the all-of-space paradigm. More particularly, the hybrid space impulse response 402 can be an average, e.g., a weighted average, of the first space impulse response 122 and the second space impulse response 136. The first and second space impulse responses 136 can be blended within the lateral apertures. As the portal opens, the lateral apertures can sweep from the forward to the rearward direction such that the forward azimuth 502 increases and azimuth of the rearward direction associated with the first space impulse response 122 decreases. In an aspect, the sweeping of the azimuths and the opening of the portal can be controlled by a rotation of a dial. More particularly, the user can turn the dial to control the degree to which the audio experience has transitioned from the MR environment to the VR environment.

Referring to FIG. 5C, a diagrammatic view of a second space impulse response of a second environment corresponding to a second audio experience is shown in accordance with an aspect. When the user-controllable setting is changed from an MR setting to a VR setting, acoustic events arriving from all directions can be associated with space impulse response values of the second space impulse response 136. The diagram represents the second space impulse response 136, which is present during the second audio experience 130 after the transition is complete. More particularly, after the portal opens completely to the second environment 132, the second space impulse response 136 is applied to acoustic events arriving from all directions relative to the listener 102. This is shown as the diagrammed circle having dense vertical lines in all directions relative to the listener 102.

Referring again to FIG. 3, and operation 210, the audio system 300 spatializes an audio signal 306 using the hybrid space impulse response 402. A reverberator 305 of the audio system 300 can receive the audio signal 306 and the hybrid space impulse response 402, e.g., as described in FIGS. 4B and 5B. The reverberator 305 can spatialize the audio signal 306. For example, the hybrid space impulse response 402 can be applied to the audio signal 306 with one or more convolution algorithms to generate the reverberation of the audio. By applying the hybrid space impulse response 402 to the audio signal 306, the audio system 300 can generate the faded audio experience 140. More particularly, the audio signal 306 can become convolved with the hybrid space impulse response 402 to generate a spatial input signal 308 that can be played back to render the faded audio experience 140.

In an aspect, the audio system 300 includes one or more speakers 310, e.g., in headphones. The speaker(s) can be driven with the spatial input signal 308 to render spatialized sound. More particularly, the spatial signal received from the reverberator 305 can be played back through the speaker 310 to render the faded audio experience 140 to the listener 102. The listener 102 may therefore enjoy a natural and smooth audio transition from an MR environment 108 to a VR environment 134. Such transition is provided by way of example, however, and the methods described herein may similarly be used to transition between other environments, e.g., between two MR environments, two VR environments, a VR environment to an MR environment, etc.

In an alternative aspect, combination of metadata encoding space impulse responses may be leveraged for other reasons. For example, rather than combining metadata for a same acoustic event within several environments to arrive at a hybrid impulse response, metadata of several acoustic events within a same environment may be combined. It will be appreciated that processing of acoustic events to render audio is resource consuming, and in some circumstances, it may be computationally efficient to apply a same space impulse response to several sources that are similarly situated and have similar characteristics. For example, if two bells ring at nearly a same location, their sounds will be similar in terms of volume and direction of arrival at the listener 102. For computing performance reasons, it may be helpful to treat the sounds as having essentially the same impulse response. More particularly, an impulse response of a first acoustic event, e.g., the first bell ring, can be blended with an impulse response of a second acoustic event, e.g., the second bell ring. The impulses can be averaged or otherwise combined, like the space impulse response combinations described above. Accordingly, a single, combined impulse response can be applied to both acoustic events to achieve a similar audio experience compared to when the impulse responses are not combined. Fewer computing resources are needed to share the combined impulse response between the acoustic events, however. Accordingly, a realistic audio experience can be achieved more efficiently.

Figure 6:
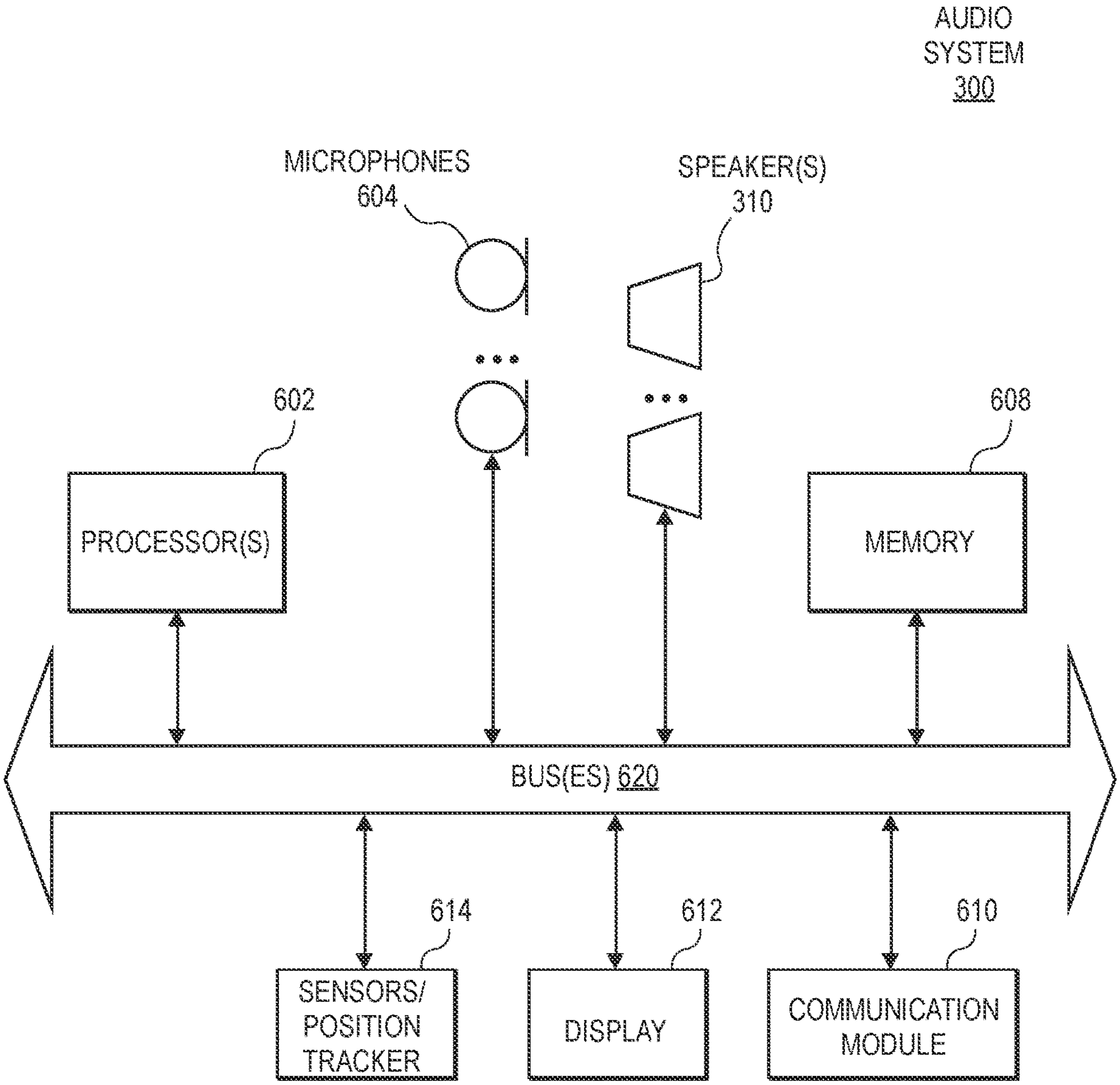
FIG. 6 is a block diagram of an audio system, in accordance with an aspect.

Referring to FIG. 6, a block diagram of an audio system is shown in accordance with an aspect. The audio system 300 can perform one or more of the algorithms and methods described in other sections using one or more programmed processors 602. Note that although this example shows various components of an audio processing system that may be incorporated into headphones, speaker systems, microphone arrays and entertainment systems, it is merely one example of a particular implementation and is merely to illustrate the types of components that may be present in the audio processing system. This example is not intended to represent any architecture or manner of interconnecting the components as such details are not germane to the aspects herein. It will also be appreciated that other types of audio processing systems that have fewer components than shown or more components than shown in this example audio system 300 can also be used. For example, some operations of the process may be performed by electronic circuitry that is within a headset housing while others are performed by electronic circuitry that is within another device that is in communication with the headset housing, e.g., a smartphone, an in-vehicle infotainment system, or a remote server. Accordingly, the processes described herein are not limited to use with the hardware and software shown in this example.

The components shown may be integrated within a housing, such as that of a smart phone, a smart speaker, a tablet computer, a head mounted display, head-worn speakers, or other electronic device described in the present disclosure. These include one or more microphones 604 which may have a fixed geometrical relationship to each other (and are therefore treated as a microphone array). The audio system 300 can include speakers 310, e.g., ear-worn speakers or loudspeakers.

The microphone signals may be provided to the processor 602 and to a memory 608 (for example, solid state non-volatile memory) for storage, in digital, discrete time format, by an audio codec. The processor 602 may also communicate with external devices via a communication module 610, for example, to communicate over the internet. The processor 602 can be a single processor or several processors.

The memory 608 may include a non-transitory machine readable medium storing instructions which when executed by the processor 602 cause the audio system 300 to perform the processes and method operations described herein. Note that some of these circuit components, and their associated digital signal processes, may be alternatively implemented by hardwired logic circuits (for example, dedicated digital filter blocks, hardwired state machines). In some aspects, the system includes a display 612 (e.g., a head mounted display).

In some aspects, the system can include one or more sensors or position trackers 614 that can include, for example, one or more cameras, inertial measurement units (IMUs), gyroscope, accelerometers, and combinations thereof. The system can apply one or more tracking algorithms to the sensed data to track a position of a user. The user position can be used in the approaches described herein, e.g., as the listener position used in ray tracing, to determine reverberation of sounds.

Various aspects described herein may be embodied, at least in part, in software. That is, the techniques may be conducted in an audio processing system in response to its processor executing a sequence of instructions contained in a storage medium, such as a non-transitory machine-readable storage medium (for example DRAM or flash memory). In various aspects, hardwired circuitry may be used in combination with software instructions to implement the techniques described herein. Thus, the techniques are not limited to any specific combination of hardware circuitry and software, or to any source for the instructions executed by the audio processing system.

In the description, certain terminology is used to describe features of various aspects. For example, in certain situations, the terms "renderer", "processor", "tracer," "reverberator," "component," "block," "modeler," "blender," "extractor," "selector," and "logic," if present, are representative of hardware and/or software configured to perform one or more functions. For instance, examples of "hardware" include, but are not limited or restricted to an integrated circuit such as a processor (for example, a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

It will be appreciated that the aspects disclosed herein can utilize memory that is remote from the system, such as a network storage device which is coupled to the audio processing system through a network interface such as a modem or Ethernet interface. Bus(es) 620 can be connected to each other through various bridges, controllers and/or adapters as is well known in the art. In one aspect, one or more network device(s) can be coupled to the bus 620. The network device(s) can be wired network devices (e.g., Ethernet) or wireless network devices (e.g., WI-FI, Bluetooth). In some aspects, various aspects described (e.g., extraction of voice and ambience from microphone signals described as being performed at the capture device, or audio and visual processing described as being performed at the playback device) can be performed by a networked server in communication with the capture device and/or the playback device.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system 300 may be implemented using electronic hardware circuitry that include electronic devices such as, for example, at least one of a processor, a memory, a programmable logic device or a logic gate. Further, processes can be implemented in any combination of hardware devices and software components.

While certain aspects have been described and shown in the accompanying drawings, it is to be understood that such aspects are merely illustrative of and not restrictive of the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

In the foregoing specification, the invention has been described with reference to specific exemplary aspects thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:

generating, by one or more processors of an audio system, a first space impulse response of a first environment;

receiving a second space impulse response of a second environment;

initiating a transition from a first audio experience to a second audio experience, wherein the first audio experience includes playback of an audio signal spatialized using the first space impulse response, and wherein the second audio experience includes playback of the audio signal spatialized using the second space impulse response;

generating, in response to initiating the transition, a hybrid space impulse response based on the first space impulse response and the second space impulse response; and spatializing the audio signal using the hybrid space impulse response to generate a faded audio experience during the transition from the first audio experience to the second audio experience.

2. The method of claim 1, wherein initiating the transition includes adjusting a user-controllable setting of the audio system.

3. The method of claim 1, wherein an acoustic event within the first environment has associated first event parameters, wherein the acoustic event within the second environment has associated second event parameters, and wherein the faded audio experience includes the acoustic event having associated faded event parameters.

4. The method of claim 3, wherein the first event parameters, second event parameters, and faded event parameters include respective one or more of a time of arrival, a direction of arrival, or a level of the acoustic event.

5. The method of claim 4, wherein generating the hybrid space impulse response includes:

determining a first value of an event parameter of the first event parameters;

determining a second value of the event parameter of the second event parameters; and generating a faded value of the event parameter of the faded event parameters, wherein the faded value is between the first value and the second value.

6. The method of claim 5, wherein the faded value of the event parameter is based on the direction of arrival of the acoustic event.

7. The method of claim 1, wherein the first space impulse response, the second space impulse response, and the hybrid space impulse response are encoded in metadata associated with the audio signal.

8. The method of claim 7, wherein the metadata includes a list of acoustic events within a predetermined frequency band.

9. The method of claim 1, wherein spatializing the audio signal includes:

convolving the audio signal with the hybrid space impulse response to generate a spatial input signal; and driving, by the one or more processors, a speaker of the audio system with the spatial input signal to render a spatialized sound.

10. The method of claim 1, wherein the first environment is a mixed reality environment, and wherein the second environment is a virtual reality environment, or wherein the first environment is the virtual reality environment, and wherein the second environment is the mixed reality environment.

11. The method of claim 1, wherein the first environment is a mixed reality environment, and wherein the second environment is a second mixed reality environment, or wherein the first environment is a virtual reality environment, and wherein the second environment is a second virtual reality environment.

12. The method of claim 1, wherein the faded audio experience is free of comb filtering.

13. An audio system, comprising:

a memory configured to store a second space impulse response of a second environment; and one or more processors configured to:

generate a first space impulse response of a first environment, initiate a transition from a first audio experience to a second audio experience, wherein the first audio experience includes playback of an audio signal spatialized using the first space impulse response, and wherein the second audio experience includes playback of the audio signal spatialized using the second space impulse response, generate, in response to initiating the transition, a hybrid space impulse response based on the first space impulse response and the second space impulse response, and spatialize the audio signal using the hybrid space impulse response to generate a faded audio experience during the transition from the first audio experience to the second audio experience.

14. The audio system of claim 13, wherein initiating the transition includes adjusting a user-controllable setting of the audio system.

15. The audio system of claim 13, wherein an acoustic event within the first environment has an associated first event parameter, wherein the acoustic event within the second environment has an associated second event parameter, wherein the faded audio experience includes the acoustic event having an associated faded event parameter, and wherein a faded value of the associated faded event parameter is between a first value of the associated first event parameter and a second value of the associated second event parameter.

16. The audio system of claim 13, wherein the first environment is a mixed reality environment, and wherein the second environment is a virtual reality environment, or wherein the first environment is the virtual reality environment, and wherein the second environment is the mixed reality environment.

17. The audio system of claim 13, wherein the first audio experience includes an acoustic event having an associated first event parameter, wherein the second audio experience includes the acoustic event having an associated second event parameter, wherein the faded audio experience includes the acoustic event having an associated faded event parameter, and wherein a faded value of the associated faded event parameter is between a first value of the associated first event parameter and a second value of the associated second event parameter.

18. The method of claim 1, wherein the first space impulse response comprises a first set of reverberation qualities of the first environment, and wherein the second space impulse response comprises a second set of reverberation qualities of the second environment.

19. A non-transitory machine-readable medium having instructions stored therein which when executed by at least one processor of an audio system causes the audio system to:

initiate a transition from a first audio experience to a second audio experience, wherein the first audio experience includes playback of an audio signal spatialized using a first space impulse response of a first environment, and wherein the second audio experience includes playback of the audio signal spatialized using a second space impulse response of a second environment;

generate, in response to initiating the transition, a third space impulse response by combining the first space impulse response and the second space impulse response; and spatialize the audio signal using the third space impulse response to generate a faded audio experience during the transition from the first audio experience to the second audio experience.

20. The non-transitory machine-readable medium of claim 19, wherein the instructions to initiate the transition comprises instructions to adjust a user-controllable setting of the audio system.

* * * * *